United States Patent
Loew

[15] 3,681,887
[45] Aug. 8, 1972

[54] DECORATIVE TRIM STRIP ASSEMBLY

[72] Inventor: Theodore Loew, Schenectady, N.Y.

[73] Assignee: The Standard Products Co., Cleveland, Ohio

[22] Filed: June 8, 1970

[21] Appl. No.: 44,639

[52] U.S. Cl................................................52/718
[51] Int. Cl.............................................E04f 19/02
[58] Field of Search....................52/716–718, 242, 52/459–461, 470

[56] References Cited

UNITED STATES PATENTS

| | | | |
|---|---|---|---|
| 1,772,417 | 8/1930 | Ellinwood.....................52/461 |
| 3,445,972 | 5/1969 | Carr..............................52/470 |

FOREIGN PATENTS OR APPLICATIONS

| | | | |
|---|---|---|---|
| 351,369 | 6/1931 | Great Britain..............52/717 |

Primary Examiner—Frank L. Abbott
Assistant Examiner—James L. Ridgill, Jr.
Attorney—Meyer, Tilberry and Body

[57] ABSTRACT

A trim strip assembly comprising two elements, one of these being a retainer element and the other being a cooperative insert strip element. The retainer element has a base strip which is adapted to be secured to a support; at the edges of the base strip there are opposed inwardly turned flanges. There is a tongue on each flange projecting toward the base strip. The cooperative insert strip element has a decorative surface strip which is generally arcuate in cross-section. Along each edge of the surface strip there is a groove, and the grooves are tightly engaged with the tongues in the assembled condition of the elements. Each one of the two elements is transversely elastically deformable for ease of assembly and disassembly. In the assembled condition, the insert element is in firm elastic engagement at its edges with the base strip, being biased into that condition by the opposed and inwardly turned flanges on the base strip with which the grooves engage by way of the tongues on the flanges. The decoratable strip on the insert is provided with a decorative laminate.

2 Claims, 5 Drawing Figures

INVENTOR.
THEODORE LOEW
BY
Meyer, Tilberry & Body
ATTORNEYS.

DECORATIVE TRIM STRIP ASSEMBLY

BACKGROUND OF THE INVENTION

1. Field of the Invention

The invention is in the field of assembled decorative trim strips, wherein a retainer element is secured in any suitable manner to a support which may be an item of furniture, the interior of an automobile or an external panel of an automobile, or any other surface which is desirably provided with a strip of some substance having some esthetic appeal to an observer. Cooperating with the retainer element is a strip insert element which has a decoratable surface. The insert element is adapted to cooperate with the retainer element in any suitable way whereby the retainer element holds the insert element in place in such a manner that the fastening means are covered by the insert.

2. Description of the Prior Art

Many of the commercially available prior art decorative trim strip assemblies are made for endwise insertion of the insert into the retainer. Such an assembly has a number of disadvantages, chief of which is that a long strip is sometimes assembled in that manner with difficulty; an example is a trailer which is provided with a 70-foot long piece of such a trim strip assembly wrapped around the four sides of the trailer. It will be readily apparent to those skilled in the art that such a long strip as that presents a number of problems when it comes to assembly of the two elements by means of endwise insertion of the insert element into the retainer element. While there are prior art devices of this general nature which are adapted to be assembled by elastic deformation of either or both of the elements, they serve somewhat different purposes or serve in somewhat different applications and lack the sophistication present in the invention here disclosed and claimed and therefore do not have the advantages of the invention here claimed.

SUMMARY OF THE INVENTION

A retainer element consists of a base strip of an extrudable plastic of which the edges have opposed, inwardly turned flanges, and a tongue on each flange projects toward the base. The base is to be fastened to a support, the fastener heads covered by an insert element arcuate in cross-section with a groove in the convex surface at each edge, a bead adjacent each groove and inward thereof, and a decoratable surface between the beads. At least one of the elements is transversely elastically deformable to allow insertion of the insert element between the flanges with the tongues tightly engaging the grooves and the insert edges on the concave side tightly engaging the base.

It is an object of this invention to provide a decorative trim strip assembly which is readily assembled or disassembled by movement of the insert perpendicular to the support on which the strip is carried, rather than by an endwise insert and sliding of one element relative to the other, the elements being assembled by elastic deformation of either or both elements.

It is another object to provide a decorative trim strip assembly in which the two basic elements are securely held together in the assembled condition without danger of accidental displacement of one element relative to the other.

It is a still further object of the invention to provide the two elements with mating surfaces which engage to make the assembly substantially watertight, to guard against the inclusion of corrosive substances between the two elements. Other objects and advantages will be apparent from a consideration of the following description and the appended drawings.

The invention may take physical form in certain parts and arrangements of parts, a preferred embodiment which will be described in detail in this specification and illustrated in the accompanying drawings which form a part hereof and wherein.

DESCRIPTION

Figure 4:
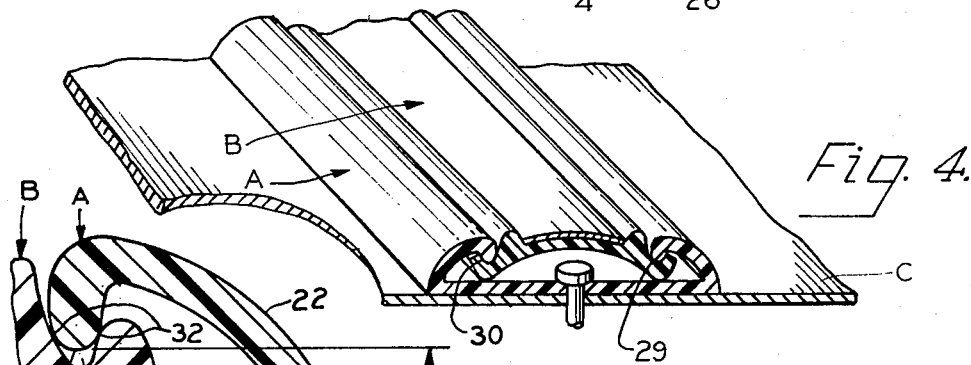
FIG. 4 is a perspective view of the two elements in assembled relation, with the retainer element being shown mounted on a support which is to be decorated by the strip.

Referring now to the drawings in detail, FIG. 4 shows a trim strip assembly comprising a retainer element A and an insert element B, the assembly being mounted on a support C, which may be a panel on an automobile, or an item of furniture, or the like.

Figure 1:
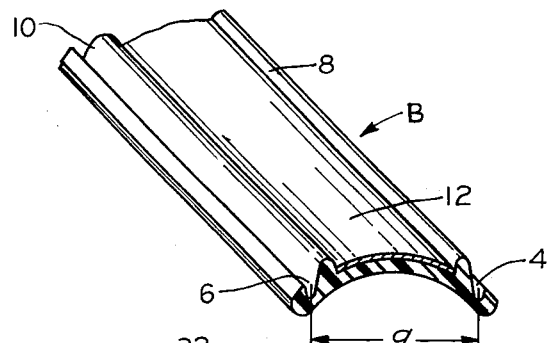
FIG. 1 is a view in perspective and in cross-section through the insert element.

Insert element B is of substantially arcuate shape in cross-section. The element is of strip form and is provided at its edges with grooves 4 and 6. Inward of grooves 4 and 6, the strip is provided with beads 8 and 10 respectively, and the strip between the beads 8 and 10 is preferably used to hold a decorative substance; thus the strip between the beads 8 and 10 is a decoratable surface strip and may be provided with a decorative laminate. There are a number of such laminates commercially available which may be bonded to the insert strip element B, which itself is a synthetic resin such as a polyvinyl chloride plastic, readily adaptable to extrusion in strip form. Thus the view in FIG. 1 is shown as provided with a bonded layer 12 which may bear any suitable pattern or which may be metallized to resemble a silver or gold trim, or the like.

Figure 2:
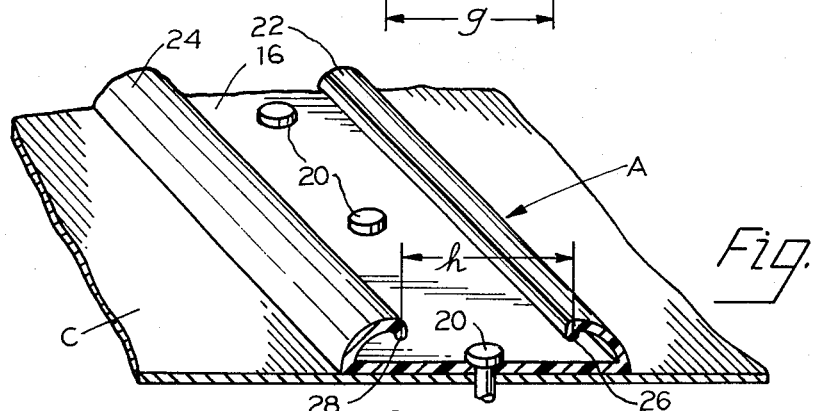
FIG. 2 is a view of the same nature of FIG. 1 but showing the retainer element, mounted on a support.

In FIG. 2, retainer element A is indicated as having a base strip 16 which is adapted to be secured to any suitable support C by any suitable fastening means 20. Such fastening means come in a variety of types, styles, sizes etc., and need not be detailed here.

At the edges of the base strip, retainer element A is provided with opposed, inwardly-turned flanges 22 and 24. Each flange is provided with a tongue which is engageable with the corresponding groove of the insert element shown in FIG. 1. Thus, flanges 22 and 24 are provided with tongues 26 and 28 respectively. In a preferred embodiment, the tongues 26 and 28 project toward the base strip 16.

The elements A and B are each formed of a flexible or resilient plastic material such as polyvinyl chloride so that by transversely flexing element B to increase its curvature its width may be decreased so that it can be inserted between flanges 22, 24.

Figure 3:
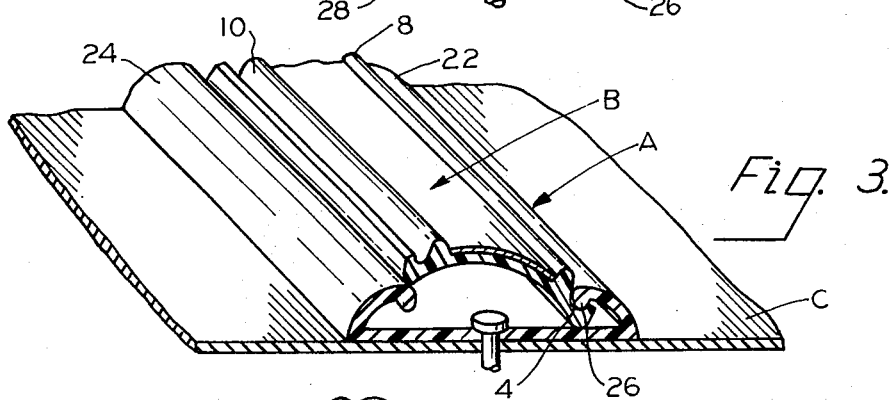
FIG. 3 is a view similar to the views of FIGS. 1 and 2 but showing the insert element being inserted into the retainer element during the assembly process.

With the retainer element A secured on its support C as indicated above, element A is ready to receive insert element B. The two elements are assembled by inserting one edge of the insert element under the corresponding flange of the retainer element, with the tongue of the flange engaging the groove in the insert. Thus, in the illustration shown in FIG. 3, tongue 26 of flange 22 is shown as engaged in groove 4 of insert element B. Assembly is thereupon completed by transverse elastic deformation of either or both of the elements A and B in order to insert the remaining edge of the insert element into the flange 24. After assembly, the parts spring back to the shape and position shown in FIG. 4. During the assembly and in the assembled condition, the beads 8 and 10 keep the insert from extending too far under either flange 22 or 24.

The two elements are shown in the fully assembled condition, with the retainer element secured on its support, in FIG. 4 of the drawings. In that figure, it can be seen that the two tongues on the flanges 22 and 24 are in tight engagement with their corresponding grooves, and it will further be noted that the concave side of the insert element B is in tight engagement at its edges with the surface of base strip 16. In this respect it is to be noted that said "tight engagement" can be accomplished in a number of ways, three of which are shown here.

The common feature of the three embodiments here shown is elastic deformation of the parts in the assembled condition, i.e., the individual elements in their "-free" or unsprung condition have given shapes or dimensions (or both) and in the assembled state have different shapes or dimensions. The result is a constant pressure exerted by the elements against each other at selected points, lines or areas. The three embodiments of this feature are shown in FIGS. 4 and 5 to which detailed reference will now be made.

In FIG. 4, tongues 26 and 28 engage their cooperating grooves 4 and 6 respectively. Tongue 26 engages the bottom of groove 4 at 29, and tongue 28 engages one side of groove 6, as at 30. In FIG. 5, tongue 26 is shown as being slightly wider than groove 4, so engagement is at both sides of the tongue and the groove, namely at points 32. In all cases, the lower face of insert B desirably engages surface 16 of retainer element A, as at 34.

Moreover, any one or all three contact lines or areas 29, 30, 32 may occur in any given strip. It will be understood by those skilled in the art that dimensional tolerances cannot, economically, be held so closely with materials like those herein contemplated as can be done with metals, nor is it necessary that they be. Consequently, the pressure which provides the seal herein referred to may provide any one, or any two, or all three of the contacts 29, 30, 32 shown in FIGS. 4 and 5.

Figure 5:
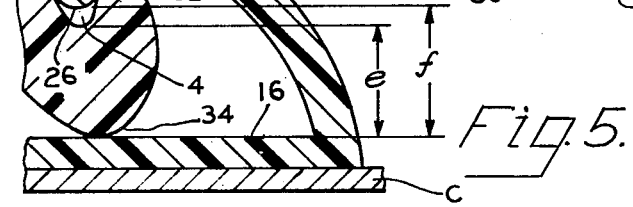
FIG. 5 is a cross-section, on a much larger scale, of a portion of the assembly.

The means by which said pressure is accomplished for any or all of the seals discussed is best seen by a consideration of FIG. 5. In the assembled condition shown, dimension $e$ is less than dimension $f$. However, to achieve the desired bias into sealing engagement, elements A and B are formed so that, in their free state (before assembly), dimension $f$ is less than dimension $e$. Then, after elastic deformation for assembly, the flange 22 continues to push tongue 26 toward surface 16 into such sealing engagement as resists further movement of the tongue toward the base strip.

Similarly, the elements A and B may be formed so that, in their free state, the transverse dimension $g$ between grooves 4 and 6 (FIG. 1) is different from the corresponding dimension $h$ between tongues 26 and 28 (FIG. 2).

Not only does such contact under pressure (the bias provided by elastic deformation) provide a desirable seal, but it also assures great resistance to relative axial displacement of elements A and B.

In the case of automobile bodies exposed to corrosive salts, conventional trim strips can store salt deposits and water between the retainer and the insert, starting corrosion at the fasteners. Such disadvantages are minimized, even largely eliminated, in trim strips made according to this invention wherein the parts are sealed to keep out salts and moisture.

The invention has been described with reference to the preferred embodiment. Obviously modifications and alterations will occur to others upon the reading and understanding of this specification. It is my intention to include all such modifications and alternations insofar as they come within the scope of the appended claims or the equivalence thereof.

What is claimed is:

1. A decorative trim strip comprising, a retainer element of non-metallic plastic having a base portion adapted to be secured to a support, a pair of opposed flanges along the side edges of said base portion, said flanges extending upwardly and inwardly of said base portion and being elastically deformable upwardly relative thereto, a tongue on each flange located inwardly of the corresponding side edges of said base portion and projecting toward said base portion, said tongues being laterally spaced apart a first distance, and a generally arcuate non-metallic plastic insert element having opposite side portions each positionable between and in sealing engagement with both a corresponding one of said flanges and the underlying surface of said base portion, each of said side portions including a groove on the convex side of said insert element for receiving the corresponding one of said tongues, said grooves being laterally spaced apart a second distance greater than said first distance and said arcuate insert element being elastically deformable about its longitudinal axis, both said flanges and said insert element being elastically deformed in the manner described upon assembly of said insert element and retainer element for said grooves to receive said tongues, whereby said first and second distances become generally equal and both said elastically deformed flanges and insert element are biased toward their undeformed dispositions to thereby cooperatively provide tight sealing engagement both between said tongues and grooves and between said side portions and base portion.

2. The trim strip according to claim 1, and beads extending along said insert element laterally inwardly of said grooves and cooperable with said tongues to limit lateral outward movement of said side portions of said insert when said retainer element and insert element are assembled.

* * * * *